(12) United States Patent
Roberts

(10) Patent No.: US 6,329,595 B1
(45) Date of Patent: Dec. 11, 2001

(54) CONCEALABLE ELECTRICAL OUTLET BOX SYSTEM

(76) Inventor: Kenneth R. Roberts, P.O. Box #344, Keene, TX (US) 76059

( * ) Notice: Subject to any disclaimer, the term of this patent is extended or adjusted under 35 U.S.C. 154(b) by 0 days.

(21) Appl. No.: 09/512,683

(22) Filed: Feb. 25, 2000

(51) Int. Cl.[7] ........................................ H01H 13/04
(52) U.S. Cl. ........................ 174/53; 174/57; 174/58; 220/3.92; 220/3.94; 248/906
(58) Field of Search ..................... 174/48, 50, 53, 174/58, 66, 67, 57; 220/241, 242, 3.8, 3.92, 3.94; 248/906, 202.1; 439/131, 501, 535

(56) References Cited

U.S. PATENT DOCUMENTS

| | | |
|---|---|---|
| D. 331,040 | 11/1992 | Mielko . |
| 2,959,633 | 11/1960 | Palmer et al. . |
| 3,433,886 * | 3/1969 | Myers ..................................... 174/57 |
| 3,992,070 * | 11/1976 | Dunn et al. ............................ 49/345 |
| 4,438,859 | 3/1984 | Solek . |
| 4,984,982 * | 1/1991 | Brownlie et al. ..................... 439/131 |
| 5,023,396 * | 6/1991 | Bartee et al. .......................... 174/48 |
| 5,359,152 | 10/1994 | Hone-Lin . |
| 5,623,124 | 4/1997 | Chien . |
| 5,726,385 | 3/1998 | Lowery et al. . |

* cited by examiner

Primary Examiner—Dean A. Reichard
Assistant Examiner—Dhiru R Patel

(57) ABSTRACT

A concealable electrical outlet box system for selectively concealing an electrical outlet box while the outlet is not in use. The concealable electrical outlet box system includes an outlet box having an outlet panel extending outwardly from an open top of the outlet box, a fixture coupling panel disposed from an edge of the outlet panel for coupling to a hinged cover panel such that the outlet box is selectively concealable within a fixture such as a cabinet.

12 Claims, 4 Drawing Sheets

CONCEALABLE ELECTRICAL OUTLET BOX SYSTEM

BACKGROUND OF THE INVENTION

1. Field of the Invention

The present invention relates to electrical outlets and more particularly pertains to a new concealable electrical outlet box system for selectively concealing an electrical outlet box while the outlet is not in use.

2. Description of the Prior Art

The use of electrical outlets is known in the prior art. More specifically, electrical outlets heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,726,385; 5,359,152; 4,438,859; 5,623,124; 2,959,633; and U.S. Pat. No. Des. 331,040.

While these devices fulfill their respective, particular objectives and requirements, the aforementioned patents do not disclose a new concealable electrical outlet box system. The inventive device includes an outlet box having a planar outlet panel extending outwardly from an open top of the outlet box, a mounting panel disposed from an edge of the outlet panel for coupling to a hinged fixture panel such that the outlet box is selectively concealable within a fixture such as a cabinet.

In these respects, the concealable electrical outlet box system according to the present invention substantially departs from the conventional concepts and designs of the prior art, and in so doing provides an apparatus primarily developed for the purpose of selectively concealing an electrical outlet box while the outlet is not in use.

SUMMARY OF THE INVENTION

In view of the foregoing disadvantages inherent in the known types of electrical outlets now present in the prior art, the present invention provides a new concealable electrical outlet box system construction wherein the same can be utilized for selectively concealing an electrical outlet box while the outlet is not in use.

The general purpose of the present invention, which will be described subsequently in greater detail, is to provide a new concealable electrical outlet box system apparatus and method which has many of the advantages of the electrical outlets mentioned heretofore and many novel features that result in a new concealable electrical outlet box system which is not anticipated, rendered obvious, suggested, or even implied by any of the prior art electrical outlets, either alone or in any combination thereof.

To attain this, the present invention generally comprises an outlet box having an outlet panel extending outwardly from an open top of the outlet box, a fixture coupling panel disposed from an edge of the outlet panel for coupling to a hinged cover panel such that the outlet box is selectively concealable within a fixture such as a cabinet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new concealable electrical outlet box system apparatus and method which has many of the advantages of the electrical outlets mentioned heretofore and many novel features that result in a new concealable electrical outlet box system which is not anticipated, rendered obvious, suggested, or even implied by any of the prior art electrical outlets, either alone or in any combination thereof.

It is another object of the present invention to provide a new concealable electrical outlet box system that may be easily and efficiently manufactured and marketed.

It is a further object of the present invention to provide a new concealable electrical outlet box system that is of a durable and reliable construction.

An even further object of the present invention is to provide a new concealable electrical outlet box system which is susceptible of a low cost of manufacture with regard to both materials and labor, and which accordingly is then susceptible of low prices of sale to the consuming public, thereby making such concealable electrical outlet box system economically available to the buying public.

Still yet another object of the present invention is to provide a new concealable electrical outlet box system which provides in the apparatuses and methods of the prior art some of the advantages thereof, while simultaneously overcoming some of the disadvantages normally associated therewith.

Still another object of the present invention is to provide a new concealable electrical outlet box system for selectively concealing an electrical outlet box while the outlet is not in use.

Yet another object of the present invention is to provide a new concealable electrical outlet box system which includes an outlet box having an outlet panel extending outwardly from an open top of the outlet box, a fixture coupling panel disposed from an edge of the outlet panel for coupling to a hinged cover panel such that the outlet box is selectively concealable within a fixture such as a cabinet.

Still yet another object of the present invention is to provide a new concealable electrical outlet box system that permits hiding of an electrical outlet when not in use.

Even still another object of the present invention is to provide a new concealable electrical outlet box system that is designed for use particularly in association with kitchen cabinets and island type cabinets and counters.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
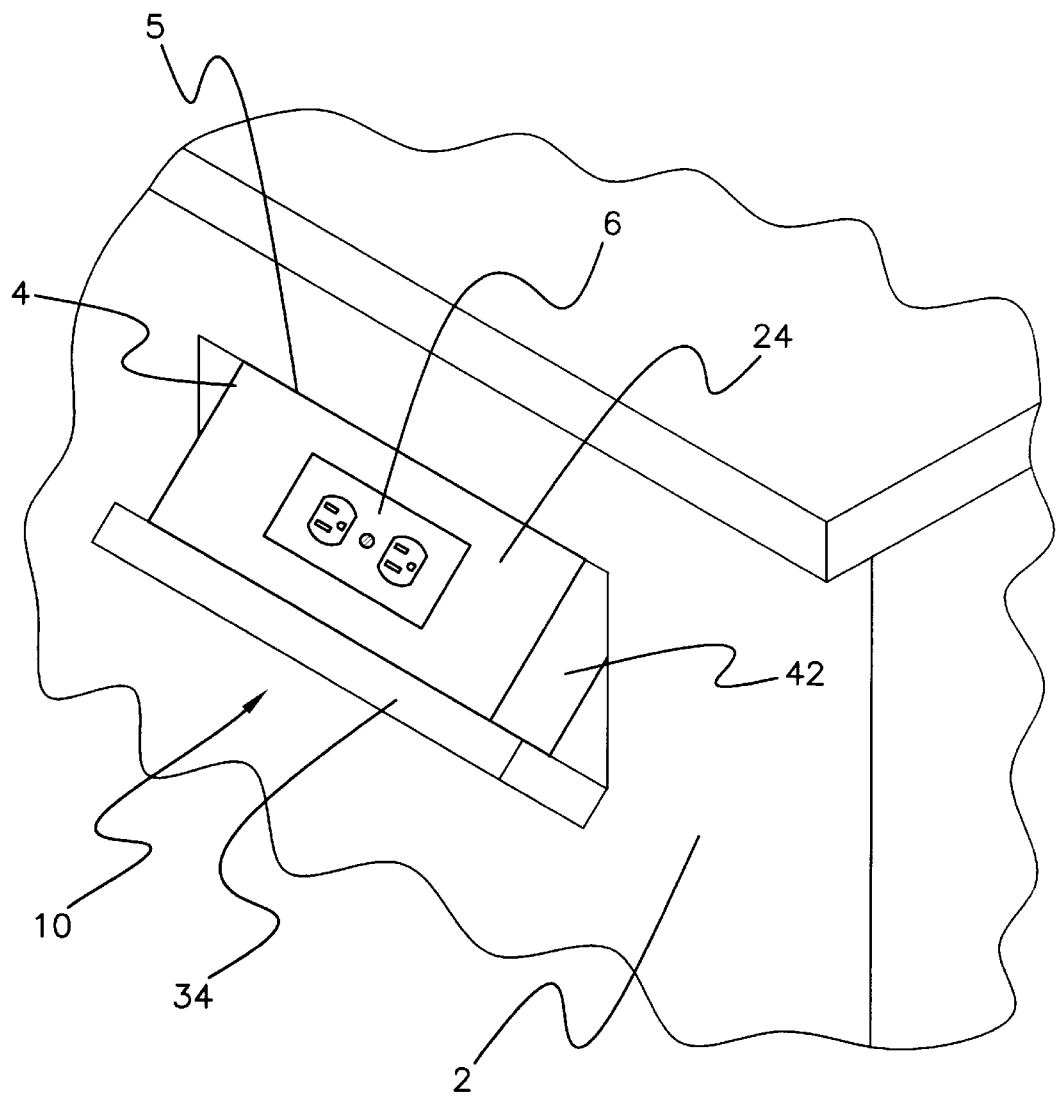
FIG. 1 is a perspective view of a new concealable electrical outlet box system according to the present invention in use.
Figure 2:
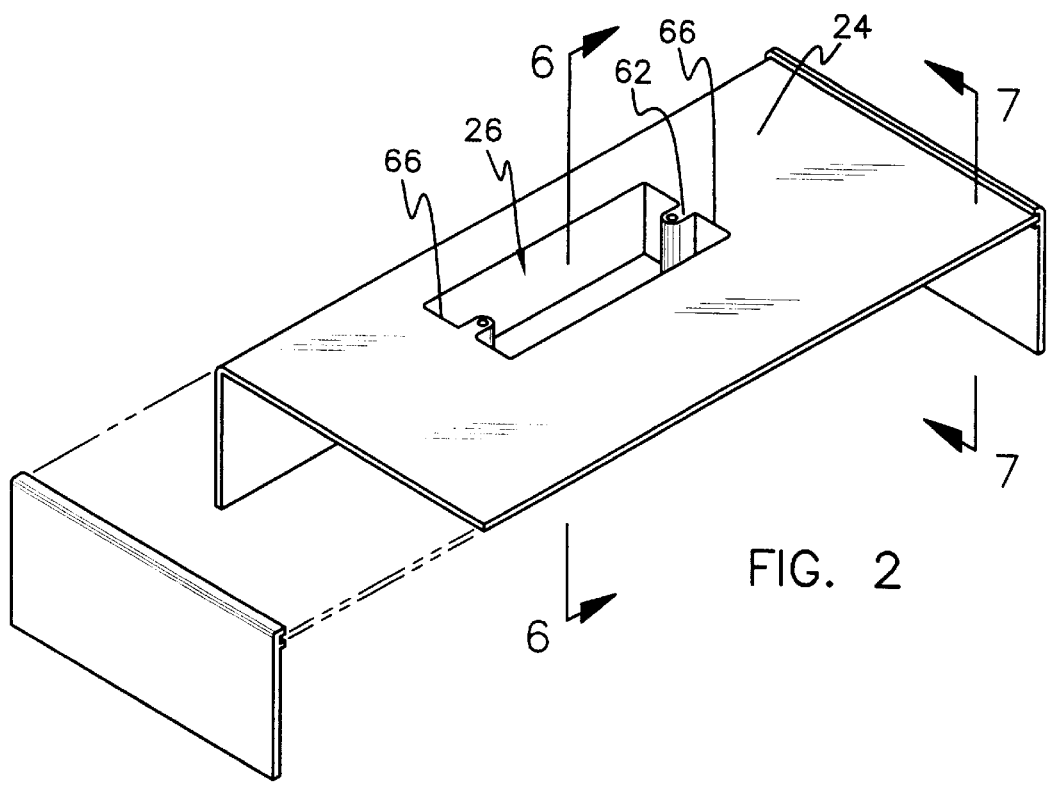
FIG. 2 is a perspective view of the present invention.

With reference now to the drawings, and in particular to FIGS. 1 through 6 thereof, a new concealable electrical outlet box system embodying the principles and concepts of the present invention and generally designated by the reference numeral 10 will be described.

As best illustrated in FIGS. 1 through 6, the concealable electrical outlet box system 10 generally comprises an outlet box 20 that includes an upper perimeter edge 22, and an outlet panel 24 that includes an outlet aperture 26. An edge 27 of the outlet aperture is coupled to the upper perimeter edge of the outlet box. A plurality of outlet boxes may be similarly coupled to the outlet panel to provide multiple electrical outlets.

Figure 3:
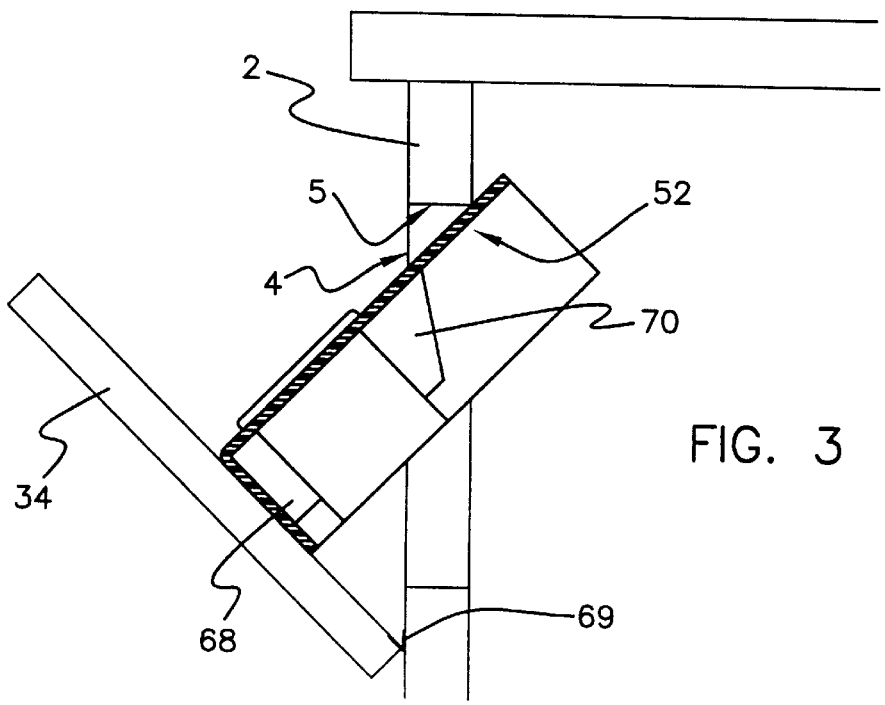
FIG. 3 is a side view of the present invention in the open position.
Figure 4:
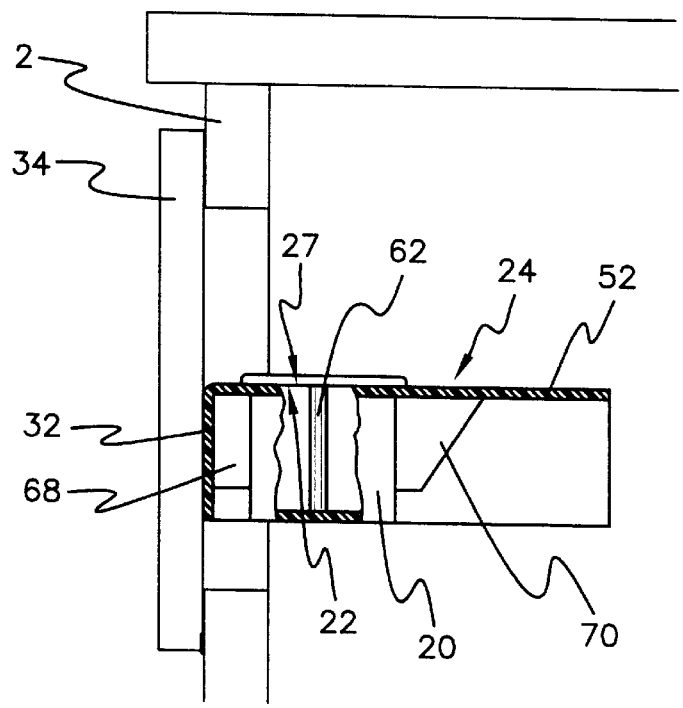
FIG. 4 is a side view of the present invention of in closed position.
Figure 5:
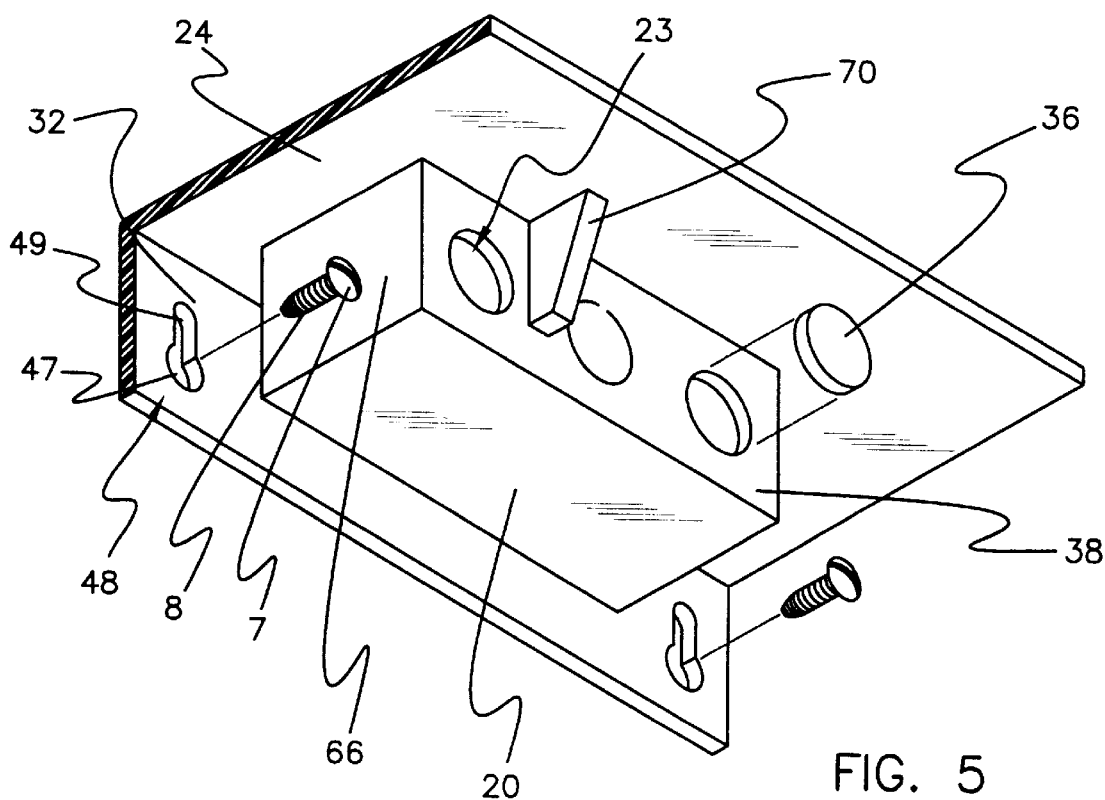
FIG. 5 is a perspective view of the underside of the present invention.
Figure 6:
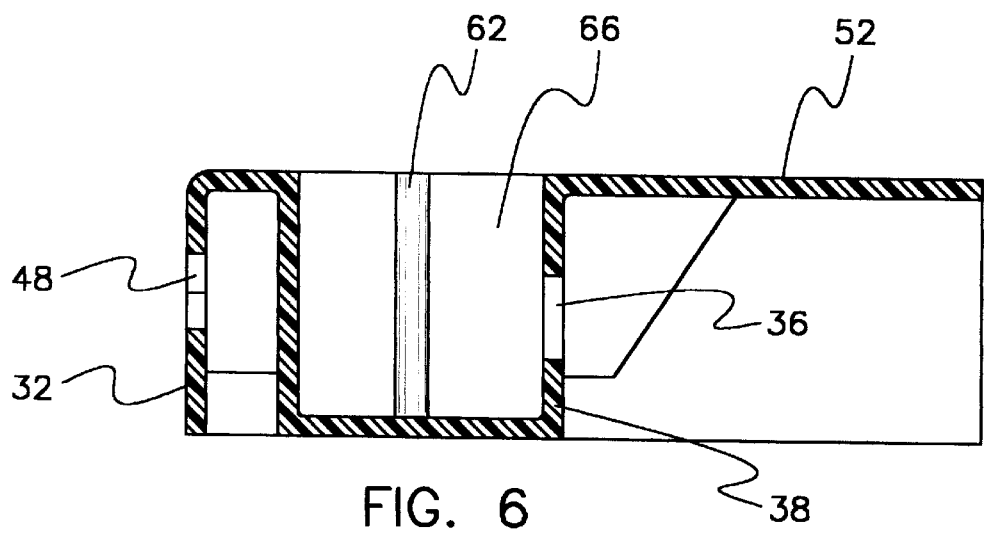
FIG. 6 is a cross-sectional view taken along line 6—6 of FIG. 2.
Figure 7:
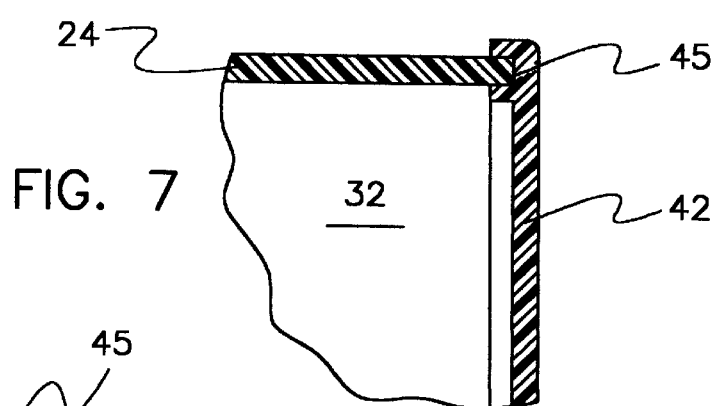
FIG. 7 is a partial cross-sectional view taken along line 7—7 of FIG. 2.
Figure 8:
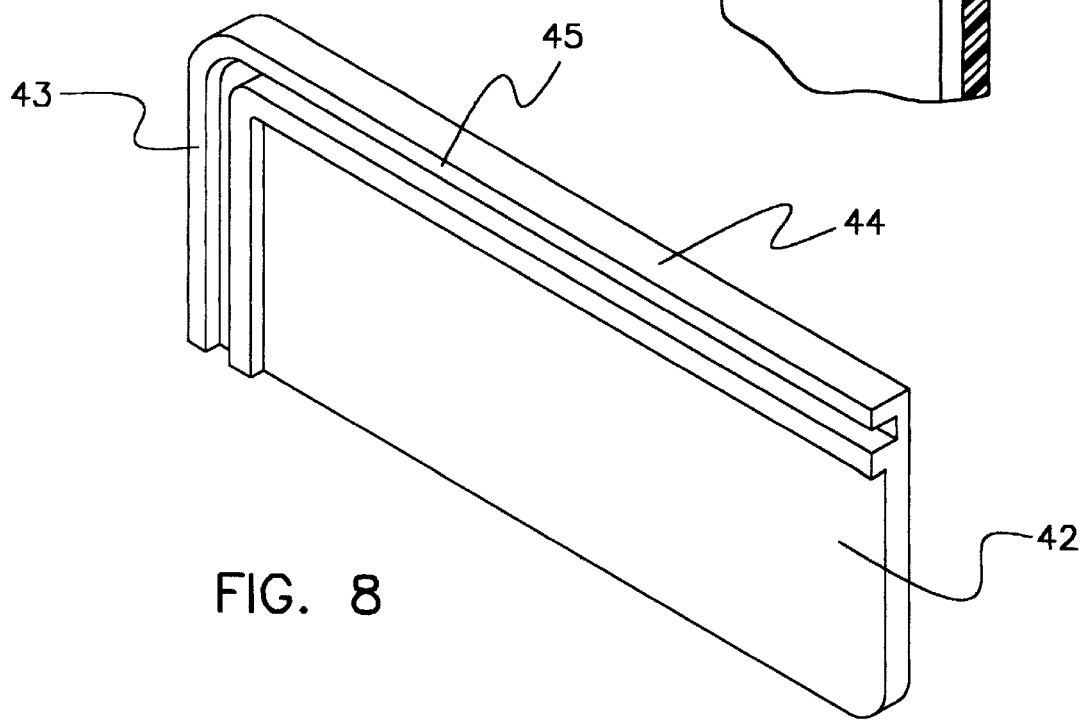
FIG. 8 is a perspective view of the end cap of the present invention.

The system also includes a fixture coupling panel 32 extending from the outlet panel and a cover panel 34. The fixture coupling panel is designed for coupling to the cover panel. The cover panel is designed for hingably mounting to a fixture 2 for covering an opening 4 in the fixture. FIG. 3 shows a hinge 69 coupling the cover panel 34 to the fixture 2.

The fixture coupling panel is mounted to the cover panel such that the outlet box is positioned in an interior space of the fixture when the cover panel is in a closed position covering the opening in the fixture.

The outlet box includes a plurality of knockout portions 36. Each of the knockout portions is selectively frangible from the outlet box for providing access to an interior space 23 of the outlet box. The knockout portions are positioned on a rear wall 38 of the outlet box. In an embodiment, the plurality of knockout portions comprises three knockout portions substantially aligned in spaced relationship to each other along a longitudinal axis of the rear wall.

A plurality of panel reinforcing ribs 68 are provided to extend between the outlet panel and the fixture coupling panel. Similarly, a plurality of box reinforcing ribs 70 are provided to extend between the outlet box and the outlet panel.

End caps 42 are provided and include a groove 45 extending along a front edge 43 and a side edge 44 of the end cap for coupling the end cap to the outlet panel and the fixture coupling panel. The end caps are designed for preventing access into the fixture when the cover panel is in an open position.

The outlet panel includes a rear portion 52 extending from the outlet box. The rear portion is designed for abutting an edge 5 of the opening in the fixture when the cover panel is in the open position.

The fixture coupling panel includes a plurality of mounting apertures 48 for facilitating coupling of the fixture coupling panel to the cover panel. In an embodiment, each of the mounting apertures includes a round portion 47 designed for receiving a head 7 of a fastener 8 therethrough and a slot portion 49 extending outwardly from the round portion.

The outlet box also includes a pair of connection portions 62. Each connection portion extends inwardly from a respective side wall 66 of the outlet box and is designed for facilitating coupling of an outlet cover plate 6 to the outlet box.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An outlet box system comprising:
   an outlet box having an upper perimeter edge;
   an outlet panel having an outlet aperture, an edge of said outlet aperture being coupled to said upper perimeter edge of said outlet box;
   a fixture coupling panel extending from said outlet panel;
   a cover panel, said fixture coupling panel being for coupling to said cover panel, said cover panel being adapted for hingably mounting to a fixture for covering an opening in the fixture;

said fixture coupling panel being mounted to said cover panel such that said outlet box is adapted for positioning in an interior space of the fixture when said cover panel is in a closed position.

2. The outlet box system of claim 1, further comprising:

said outlet box including a plurality of knockout portions, said knockout portions being frangible from said outlet box for providing access to an interior space of said outlet box.

3. The outlet box system of claim 2, further comprising:

said knockout portions being positioned on a rear wall of said outlet box.

4. The outlet box system of claim 3, wherein said plurality of knockout portions comprises three knockout portions substantially aligned in spaced relationship to each other along a longitudinal axis of said rear wall.

5. The outlet box system of claim 1, further comprising:

a plurality of panel reinforcing ribs extending between said outlet panel and said fixture coupling panel.

6. The outlet box system of claim 1, further comprising:

a plurality of box reinforcing ribs extending between said outlet box and said outlet panel.

7. The outlet box system of claim 1, further comprising:

a pair of end caps, each of said pair of end caps having a groove extending along a front and a side edge for coupling said pair of end caps to said outlet panel and said fixture coupling panel, said end caps being adapted for preventing access into said fixture when said cover panel is in an open position.

8. The outlet box system of claim 7, further comprising:

said outlet panel having a rear portion extending from said outlet box, said rear portion being adapted for abutting an edge of the opening in the fixture when said cover panel is in an open position.

9. The outlet box system of claim 1, further comprising:

said fixture coupling panel having a plurality of mounting apertures for facilitating coupling of said fixture coupling panel to said cover panel.

10. The outlet box system of claim 9, wherein each of said mounting apertures includes a round portion adapted for receiving a head of a fastener therethrough and a slot portion extending outwardly from said round portion.

11. The outlet box system of claim 1, further comprising:

said outlet box including a pair of connection portions, each connection portion extending inwardly from a respective side wall of said outlet box, each connection portion being adapted for facilitating coupling of an outlet cover plate to said outlet box.

12. An outlet box system comprising:

an outlet box having an upper perimeter edge;

an outlet panel having an outlet aperture, an edge of said outlet aperture being coupled to said upper perimeter edge of said outlet box;

a fixture coupling panel extending from said outlet panel;

a cover panel, said fixture coupling panel being for coupling to said cover panel, said cover panel being adapted for hingably mounting to a fixture for covering an opening in the fixture;

said fixture coupling panel being mounted to said cover panel such that said outlet box is adapted for positioning in an interior space of the fixture when said cover panel is in a closed position;

said outlet box including a plurality of knockout portions, said knockout portions being frangible from said outlet box for providing access to an interior space of said outlet box;

said knockout portions being positioned on a rear wall of said outlet box;

wherein said plurality of knockout portions comprises three knockout portions substantially aligned in spaced relationship to each other along a longitudinal axis of said rear wall;

a plurality of panel reinforcing ribs extending between said outlet panel and said fixture coupling panel;

a plurality of box reinforcing ribs extending between said outlet box and said outlet panel;

a pair of end caps, each of said pair of end caps having a groove extending along a front and a side edge for coupling said pair of end caps to said outlet panel and said fixture coupling panel, said end caps being adapted for preventing access into said fixture when said cover panel is in an open position;

said outlet panel having a rear portion extending from said outlet box, said rear portion being adapted for abutting an edge of the opening in the fixture when said cover panel is in said open position;

said fixture coupling panel having a plurality of mounting apertures for facilitating coupling of said fixture coupling panel to said cover panel;

wherein each of said mounting apertures includes a round portion adapted for receiving a head of a fastener therethrough and a slot portion extending outwardly from said round portion; and said outlet box including a pair of connection portions, each connection portion extending inwardly from a respective side wall of said outlet box, each connection portion being adapted for facilitating coupling of an outlet cover plate to said outlet box.

* * * * *